United States Patent
Yamada

[19]
[11] Patent Number: 5,874,941
[45] Date of Patent: Feb. 23, 1999

[54] PRESENTATION SUPPORTING DEVICE

[75] Inventor: Keizo Yamada, Tokyo, Japan

[73] Assignee: NEC Corporation, Tokyo, Japan

[21] Appl. No.: 534,299

[22] Filed: Sep. 27, 1995

[30] Foreign Application Priority Data

Sep. 28, 1994 [JP] Japan .................................. 6-233492

[51] Int. Cl.⁶ .................................................. G09G 5/08
[52] U.S. Cl. ........................... 345/157; 345/159; 345/158
[58] Field of Search .................................... 345/163, 166, 345/157, 158, 156, 159, 161, 162, 169, 145, 146; 340/988

[56] References Cited

U.S. PATENT DOCUMENTS

| | | | |
|---|---|---|---|
| 4,839,838 | 6/1989 | LaBiche et al. | 345/157 |
| 5,181,181 | 1/1993 | Glynn | 345/163 |
| 5,296,871 | 3/1994 | Paley | 345/156 |
| 5,615,132 | 3/1997 | Horton et al. | 340/988 |

OTHER PUBLICATIONS

Lynn M. Roylance et al., "A Batch–Fabricated Silicon Accelerometer", *IEEE Transactions on Electron Devices*, vol. ED–26, No. 12, Dec. 1979, pp. 1911–1917.

*Primary Examiner*—Xiao Wu
*Attorney, Agent, or Firm*—Sughrue, Mion, Zinn, Macpeak & Seas, PLLC

[57] ABSTRACT

A presentation supporting device having excellent operability and adaptability to oral presentations in a computer multimedia environment. First and second accelerometers detect first and second acceleration of gravity resulting from inclinations in first and second sensitivity axis directions perpendicular to each other to output first and second acceleration signals, and first and second signal processors process the input first and second acceleration signals to output cursor moving control signals for controlling moving speeds and moving directions in the first and second coordinate axis directions of a cursor on a computer display screen in response to voltage values and polarities of the first and second acceleration signals.

15 Claims, 8 Drawing Sheets

PRESENTATION SUPPORTING DEVICE

BACKGROUND OF THE INVENTION

The present invention relates to a presentation supporting device and more particularly to a presentation supporting device suitably used for pointing at in a presentation display image using a computer in a lecture such as an oral presentation of an academic society or the like.

DESCRIPTION OF THE RELATED ARTS

In an oral presentation of a lecture of an academic society or the like, for better understanding of its presentation content by a large audience, an OHP (overhead projector) and a slide projector have been used for displaying images. In the lecture of this kind, with its progress, the part corresponding to the talk is required to be pointed at on the display screen. At present, a pointing rod mainly made of a metal or a laser pointer using a laser beam of a semiconductor laser or the like is employed.

In future, in the oral presentation, the use of a multimedia environment of computers is expected to become the mainstream. In such a case, a cursor as a pointing device is used in place of the pointing rod. And a means for moving the cursor position to be shown on the computer display, which is easily operable by a lecturer will become very important.

As the most basic means for moving the cursor position, a numerical input of coordinates of a movable object using a keyboard is conceivable. However, this numerical input irrespective of the representation content in the middle of the lecture interferes with the lecture and thus is not desirable.

Then, as a means capable of moving a cursor in the same manner as a usual human, conventionally, a mouse used as a coordinate input device of a computer has been proposed. With the use of the mouse, it is possible to move the cursor in proportion to the human motion and operation efficiency can be expected to be improved. As well-known, the first mouse widely used includes a rubber ball which is properly supported therein and is rotated in a work plane in contact therewith to detect its rotation. In order to detect the position of the rotating ball, usually, an optical encoder is used. The optical encoder is mounted on a rotation shaft of the ball and generates pulses in proportion to the rotation of the ball.

Another optical mouse, a non-contact mouse using no ball has been developed as the second mouse. This second mouse uses a plate having dots with different reflectances formed at an equal interval as a work plane where the mouse moves. In this case, the mouse is provided with a light beam generator, a light reflector, and a detector of the reflected light from the work plane. With the movement of the mouse in the work plane, the reflected light passes through the areas having different reflectances aligned at the equal interval and hence is modulated to a pulse form. Hence, by measuring the number of the pulses, the coordinates can be obtained. In the above two cases, the first or second mouse is moved in contact with or separated from the work plane and inputs the coordinates moving along the work plane.

On the other hand, a further mouse to input coordinates in a completely non-contact manner has been known as the third mouse. The third mouse known as a 6-axes mouse can input translational moving distances or coordinates in directions of x, y and z axes and rotations around these three axes. This 6-axes mouse has three accelerometers and three rate sensors. A double integration of an acceleration indicates a distance, as well-known and a single integration of an output of the rate sensor shows a rotation amount. In this 6-axes mouse, the outputs of the accelerometers having sensitivity axes in the x, y and z directions are each double-integrated to calculate the translational moving distances in the x, y and z directions, and the outputs of the rate sensors having sensitivity axes around the x, y and z axes are each single-integrated to output the rotation amounts. As a result, when the 6-axes mouse is moved in the space, its actual movement can be input into the computer. That is, when the 6-axes mouse is used, the distances or rotations in conformity with the actual moving distance of the mouse can be input into the computer using the multiple integrations.

In the foregoing conventional presentation supporting devices, the pointing using the pointing technique such as the pointing rod or the laser pointer can not be matched with the presentation in the multimedia environment using the computer.

Also, in the conventional cases using the first and second mice, the movement in the plane directly irrespective of the lecture content is required, And this hinders the lecture and is unattractive in appearance.

Further, in the conventional case using the 6-axes mouse, since the mouse movement is directly reflected as it is, when the cursor is moved largely, the hand is moved largely, and vice versa. As a result, the hand motion becomes very large in the presentation. Moreover, when the double integration is used, a correction of accumulated errors, a correction for removing the influence of gravity, an optimization of the cursor moving speed and so on are required, which is difficult and is not practical.

Moreover, the usual mouse such as the conventional first or second mouse is produced on the assumption that the mouse is used by one person when inputting data, and hence such a mouse can not adapt to the computer presentation technique which enables a plurality of persons to question and answer on the display.

SUMMARY OF THE INVENTION

It is therefore an object of the present invention to provide a presentation supporting device in view of the aforementioned problems of the prior art, which is capable of readily moving a cursor in the desired position on a display and adapting to a presentation in a multimedia environment using a computer.

In accordance with one aspect of the present invention, there is provided a presentation supporting device, comprises: first and second accelerometers for detecting first and second acceleration of gravity resulting from inclinations in first and second sensitivity axis directions perpendicular to each other to output first and second acceleration signals; and first and second signal processors for processing the input first and second acceleration signals to output cursor moving control signals for controlling moving speeds and moving directions in the first and second coordinate axis directions of a cursor on a computer display screen in response to voltage values and polarities of the first and second acceleration signals.

In accordance with another aspect of the present invention, there is provided a presentation supporting device, comprising an algorithm which includes; a first step for converting first and second acceleration signals representing first and second acceleration of gravity resulting from inclinations in first and second sensitivity axis directions perpendicular to each other to first and second pulse signals of respective first and second frequencies; a second step for converting the first and second pulse signals to first and second numeric values representing the respective first and second frequencies; a third step for converting the first and second numeric values to first and second coded numeric values using predetermined first and second conversion tables, the coded numeric value having a value of 0 when the inclination is 0 and increasing in proportion to an increase of the inclination; a fourth step for ignoring the first and second coded numeric values lower than a predetermined threshold value to output respective first and second inclination values; a fifth step for multiplying the first and second inclination values by a predetermined magnification to output respective first and second cursor moving values; and a sixth step for adding the first and second cursor moving values to first and second cursor values corresponding to the position of the cursor displayed at present.

In accordance with still another aspect of the present invention, there is provided a presentation supporting device, comprising; a magnetometer to output a direction signal, arranged so that its sensitivity axis is parallel to a ground surface; an accelerometer arranged so that its sensitivity axis is perpendicular to the sensitivity axis of the magnetometer, for detecting acceleration of gravity resulting from an inclination of the sensitivity axis to output an acceleration signal; and first and second signal processors for processing the input direction signal and the acceleration signal to output cursor moving control signals for controlling moving speeds and moving directions in horizontal and vertical coordinate axis directions of a cursor on a computer display screen in response to voltage values and polarities of the direction signal and the acceleration signal.

Further, preferably, according to the present invention, there is provided a presentation supporting device, comprising the above two presentation supporting devices, one including the two first and second accelerometers and the other including one magnetometer and one accelerometer for controlling first and second cursors having first and second identification numbers, which are displayed on a computer display screen and are independently movable.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1A:
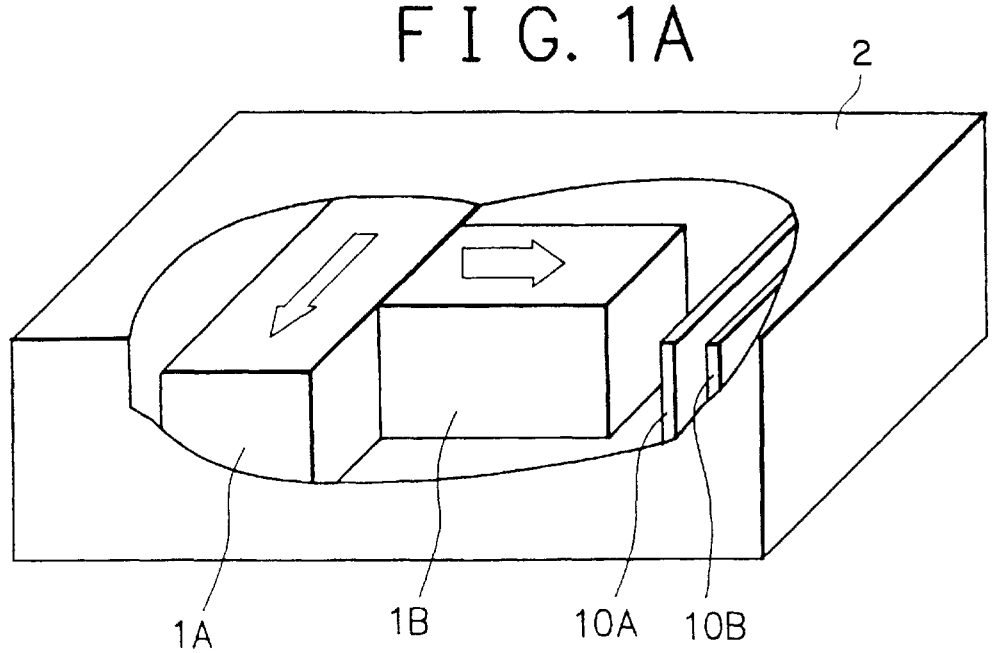
FIG. 1A is a schematic perspective view, partly broken, of the first embodiment of a presentation supporting device according to the present invention
Figure 1B:
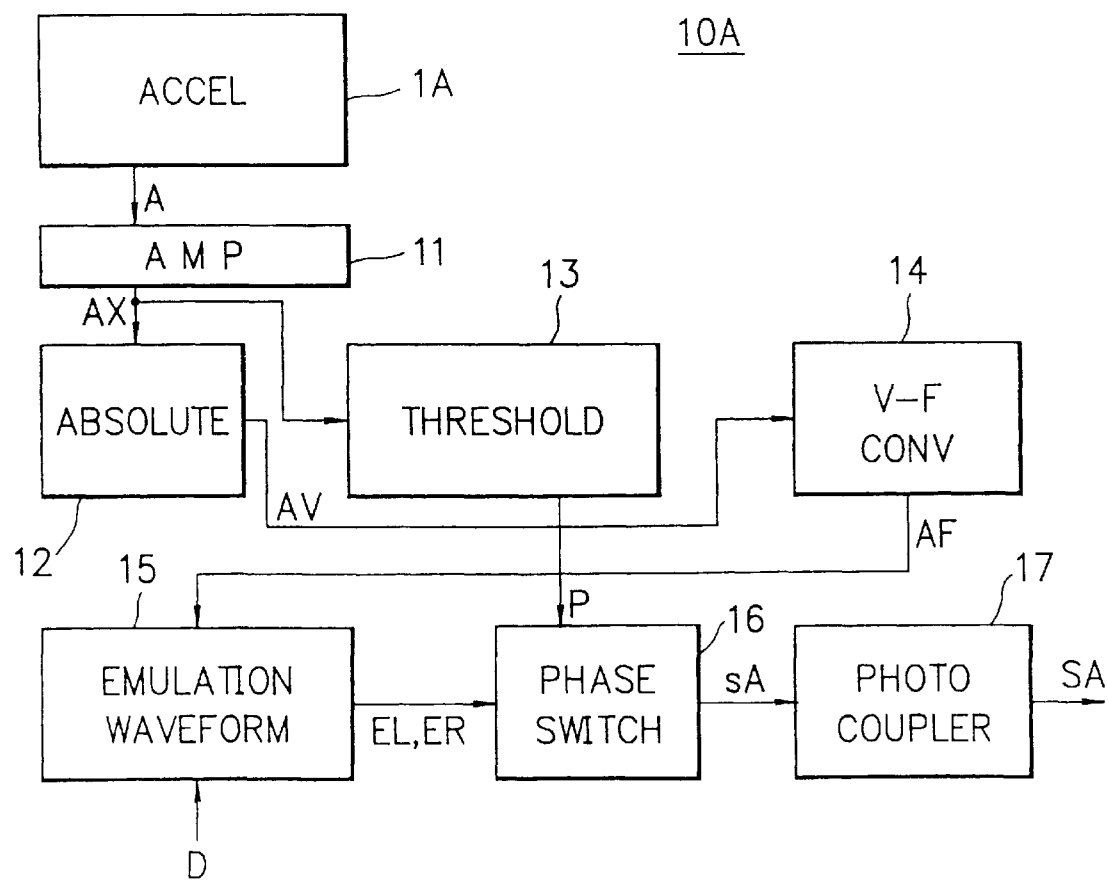
FIG. 1B is a block diagram of the presentation supporting device shown in FIG. 1A.

Referring now to the drawings, wherein like reference characters designate like or corresponding parts throughout the views and thus the repeated description thereof can be omitted for brevity, there is shown in FIG. 1A and FIG. 1B the first embodiment of a presentation supporting device according to the present invention.

As shown in FIG. 1A and FIG. 1B, the presentation supporting device (often referred to as "pointer" in short later) comprises a pair of accelerometers 1A and 1B and a pair of signal processors 10A and 10B which are contained in a box body 2.

The two accelerometers 1A and 1B are arranged in perpendicular positions so that their sensitivity axes are mounted in the perpendicular directions, that is, one extends in the front and rear direction and the other in the right and left side direction. The accelerometers 1A and 1B generate acceleration signals AA and AB (referred to as "A" later unless otherwise distinction is required between the two) in proportion to acceleration AA and AB, respectively. The signal processors 10A and 10B input the acceleration signals AA and AB, respectively, and output cursor moving signals SA and SB, respectively.

Each signal processors 10A or 10B includes an amplifier circuit 11 for amplifying the input acceleration signal A to output an amplified signal AX, an absolute value circuit 12 for converting the amplified signal AX to an absolute value signal AV, a threshold circuit 13 for discriminating large or small with respect to a voltage reference value 0 of the amplified signal AX to output a phase switch signal P, a voltage frequency conversion circuit 14 for converting the voltage of the absolute value signal AV into a pulse signal AF of the corresponding frequency, an emulation waveform generator circuit 15 for converting the pulse signal AF into emulation waveforms EL and ER as control signals for moving the cursor, a phase switch circuit 16 for selecting either the emulation waveform EL or ER in response to the phase switch signal P to output a switch signal sA, and a photo coupler 17 for isolating the switch signal sA to supply the cursor moving signal SA to a mouse of a computer.

In the conventional mouse to calculate the moving distance from the double integration of the acceleration, the influence of the acceleration of gravity must completely removed to prevent the occurrence of the measuring error. On the contrary, according to the present invention, the influence of the acceleration of gravity is positively used.

In this embodiment, concerning the accelerometers 1A and 1B as the key component, for example, a conventional semiconductor accelerometer can be used, as disclosed in "A Batch-Fabricated Silicon Accelerometer" by L. M. Roylance and J. B. Angell, IEEE Transactions on Electron Devices, Vol. ED-26, No. 12, December 1979. This semiconductor accelerometer is fabricated using the IC technique and possesses a miniature size of 3×2 mm and a thickness of approximately 0. 5 mm, having a combination of a semiconductor strain gauge produced by a diffusion method and a cantilevered beam with a receptive mass attached to its free end. In place of the cantilevered beam, there may be employed a mass-supporting beam member fixed at both ends.

In the semiconductor accelerometer using the cantilevered beam with the receptive mass attached to its free end, a stress given to the receptive mass is detected by the semiconductor strain gauge attached to the mount end of the cantilevered beam, thereby measuring the acceleration corresponding to the given stress. Hence, for instance, different from a piezoelectric accelerometer having a piezoelectric element using PTZ ceramics for detecting an acceleration by applying a physical stress corresponding to the acceleration to the piezoelectric element, in this embodiment, a static acceleration such as the acceleration of gravity can be measured. The acceleration of gravity is maximum in the vertical direction and minimum in the horizontal direction. The output voltage of the accelerometer is thus expressed by a function of angle with respect to the vertical direction. An inclination of a plane having an acceleration of gravity as a normal vector can be obtained using two accelerometers whose acceleration detecting axes are adjusted to perpendicular positions to each other. By allowing the output signal of one accelerometer in proportion to the vertical flapping motion of the pointer to correspond to the vertical movement of the cursor and allowing the output signal of the other accelerometer in proportion to the horizontal slant motion of the pointer to correspond to the horizontal movement of the cursor, the movement of the cursor in nearly synchronism with the motion of the pointer can be attained.

Next, the operation of the presentation supporting device described above will now be described with reference to FIG. 1A and FIG. 1B.

Figure 2:
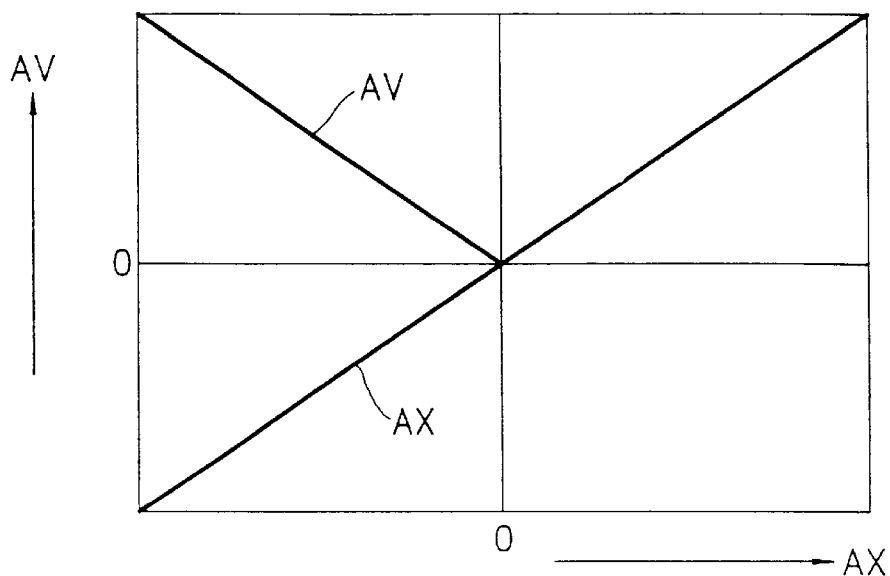
FIG. 2 is a schematic diagram showing absolute value conversion characteristic produced in an absolute value circuit shown in FIG. 1B.

First, the acceleration signals AA and AB as the output signals of the accelerometers 1A and 1B are the functions of the inclinations with respect to the acceleration of gravity G. In other words, if the voltages of the acceleration signals AA and AB are set to the reference value 0 when the pointer is placed at a level, the acceleration signals AA and AB show positive or negative voltages proportional to cosines of their inclination angles against a level surface. Next, the amplifier circuit 11 amplifies the acceleration signal A to about 1 V/G to supply this amplified signal AX to the absolute value circuit 12. The absolute value circuit 12 converts the amplified signal AX to the absolute value signal AV which is the voltage signal regardless of the polarities, as shown in FIG. 2. on the other hand, the threshold circuit 13 discriminates whether or not the voltage of the amplified signal AX is larger than the reference value o, that is, the polarity of the amplified signal AX to output the phase switch signal P corresponding to the discrimination result. The voltage frequency conversion circuit 14, for example, is composed of a conventional voltage-controlled oscillator and converts the absolute value signal AV to the pulse signal AF with the frequency proportional to the absolute value signal AV. The absolute value signal AV indicates only the absolute value of the applied acceleration A and hence the pulse signal AF becomes the pulse signal with the frequency proportional to the absolute value of the acceleration. Hence, with the increase of the inclination amount, the pulse number of the pulse signal AF increases. Then, emulation waveform generator circuit 15 converts the pulse signal AF to the emulation waveform E as the control signal of the cursor moving. The emulation waveform E consists of two pulses EL and ER having a phase difference which is determined by a phase difference set-up signal D, and the moving direction of the cursor can be determined by the phase difference between the pulses EL and ER. The phase switch circuit 16 sets the switch to be controlled in response to the supplied phase switch signal P and selects either the emulation waveform pulse EL or ER corresponding to the polarity of the amplified signal AX to output the switch signal sA. The photo coupler 17 isolates the switch signal sA to output the cursor moving signal SA to be directly fed to the input of the mouse of the computer.

As described above, when the lecturer inclines the pointer, two pulse signals having the frequency proportional to the inclination amount and the direction of the inclination are generated and one proper pulse signal is selected. The cursor is thus moved at the distance proportional to the inclination amount in the direction of the inclination.

In this embodiment, as described above, since no translational acceleration is used, even when the lecturer requires a large cursor moving, it is unnecessary to largely wave the hand. Different from the conventional device wherein the cursor moving distance and the rotation amount are calculated using the integration, in this embodiment, there is no integration error accumulated, the system is very stable. The conventional device using the double integration requires many corrections such as the correction of the influence of gravity, the correction by the pointer rotation and so on. However, in this embodiment, in principle, no correction is required for the pointer.

Furthermore, the output signal of this pointer is perfectly compatible with the output signal of the conventional usual mouse such as the first and second mice. Hence, when the pointer is coupled with an input port adaptable to the usual mouse, the cursor can be moved in the same manner as the usual mouse.

In this embodiment, in fact, when there are choices in the position pointed by the cursor, the pointer is provided with a button (not shown) for selecting the choices. That is, like the usual mouse, by pushing this selection button, the start of the operation can be instructed.

In general, it is hard for the lecturer to keep the hand completely holding in a fixed position and the unintentional movement of the hand can be seen as with the laser pointer. This is an eyesore and undesirable for the audience very much and thus the pointer is expected to have suitable play so that the displayed cursor may not move.

Figure 3:
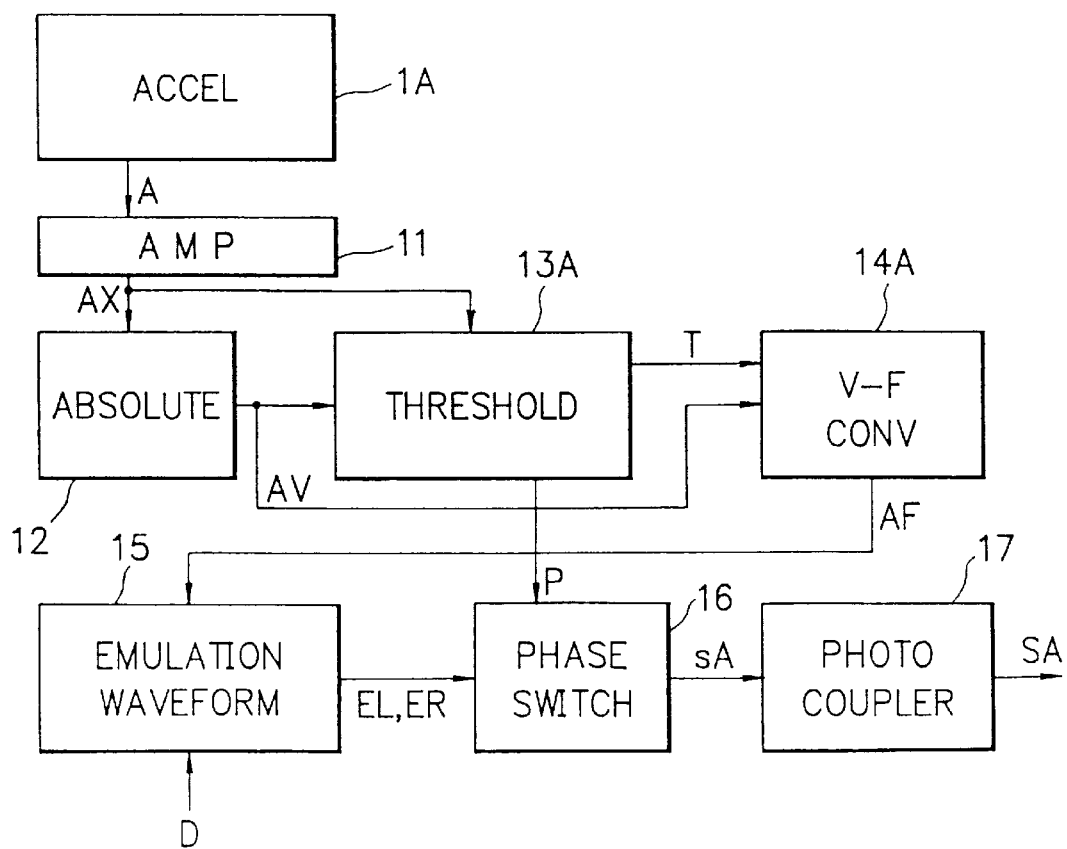
FIG. 3 is a block diagram of the second embodiment of a presentation supporting device according to the present invention.

In FIG. 3, there is shown the second embodiment of a presentation supporting device according to the present invention. In this embodiment, the presentation supporting device further includes a cursor movement prevention device for preventing an occurrence of a cursor moving signal against a small inclination.

In this embodiment, as shown in Fig, 3, the difference from the first embodiment is that a threshold circuit 13A and a voltage frequency conversion circuit 14A are provided in place of the threshold circuit 13 and the voltage frequency conversion circuit 14. In addition to the phase switch signal P, the threshold circuit 13A further outputs an enable signal T for stopping the generation of the cursor moving pulse in response to the absolute value signal AV having an absolute value lower than a fixed value. The voltage frequency conversion circuit 14A controls to stop the voltage frequency conversion operation in response to the enable signal T supplied from the threshold circuit 13A.

Figure 4A:
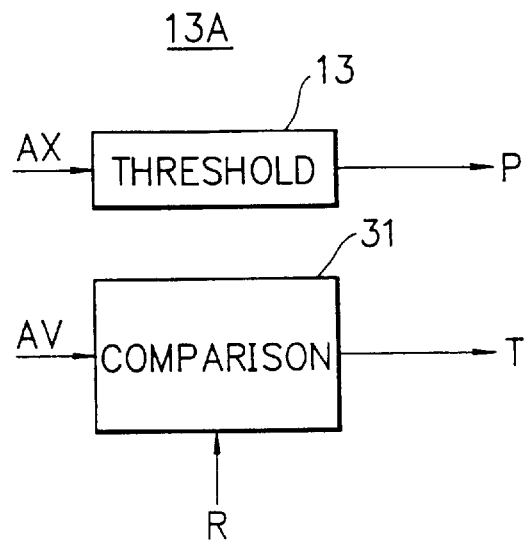
FIG. 4A is a block diagram of a threshold circuit shown in FIG. 3

FIG. 4A illustrates the threshold circuit 13A. The threshold circuit 13A consists of the threshold circuit 13 of the first embodiment and a comparison circuit 31 for comparing the absolute value signal AV with a predetermined reference value R to output the enable signal T.

Figure 4B:
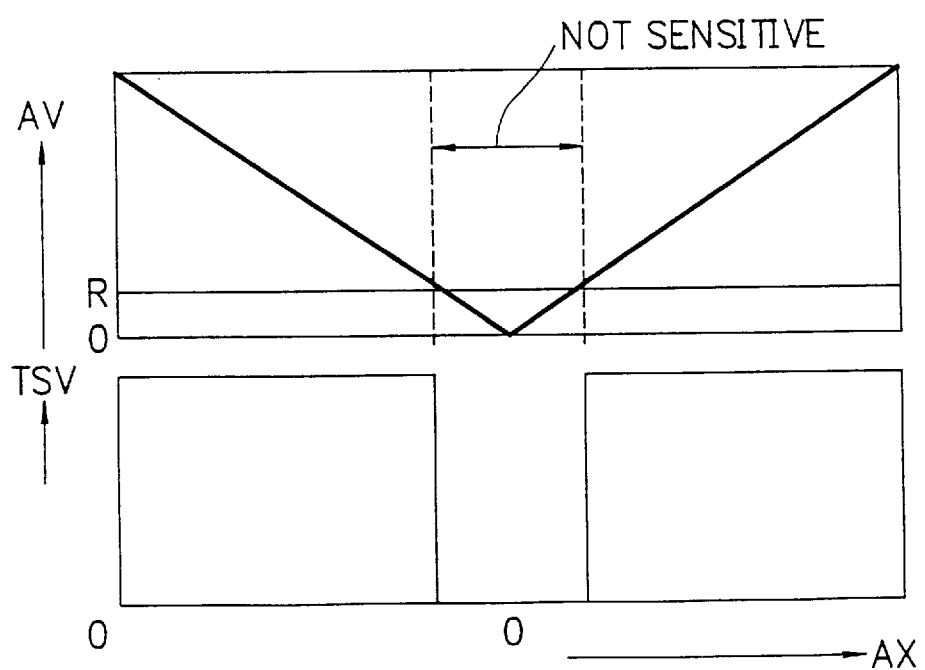
FIG. 4B is a schematic diagram showing a characteristic of a comparison circuit shown in FIG. 4A.

Now, the operation of the threshold circuit 13A and the voltage frequency conversion circuit 14A will be described in connection with FIG. 3, FIG. 4A and FIG. 4B. In the threshold circuit 13A, the comparison circuit 31 outputs either an enable signal T having a low level (0 V) when the value of the absolute value signal AV is lower than the reference value R or an enable signal T having a high level (5 V) when the value of the absolute value signal AV is higher than the reference value R. Then, the voltage frequency conversion circuit 14A controls the operation of the voltage frequency conversion in response to the voltage level of the enable signal T, that is, operates the voltage frequency conversion in response to the absolute value signal AV when the enable signal T has the high level and alternatively stops the voltage frequency conversion operation when the enable signal T has the low level. The voltage frequency conversion circuit 14A, for example, can be composed of a voltage-controlled oscillator having a bias circuit so as to oscillate when a supplied bias voltage is high level or to stop the oscillation when the bias voltage is low level.

Figure 5:
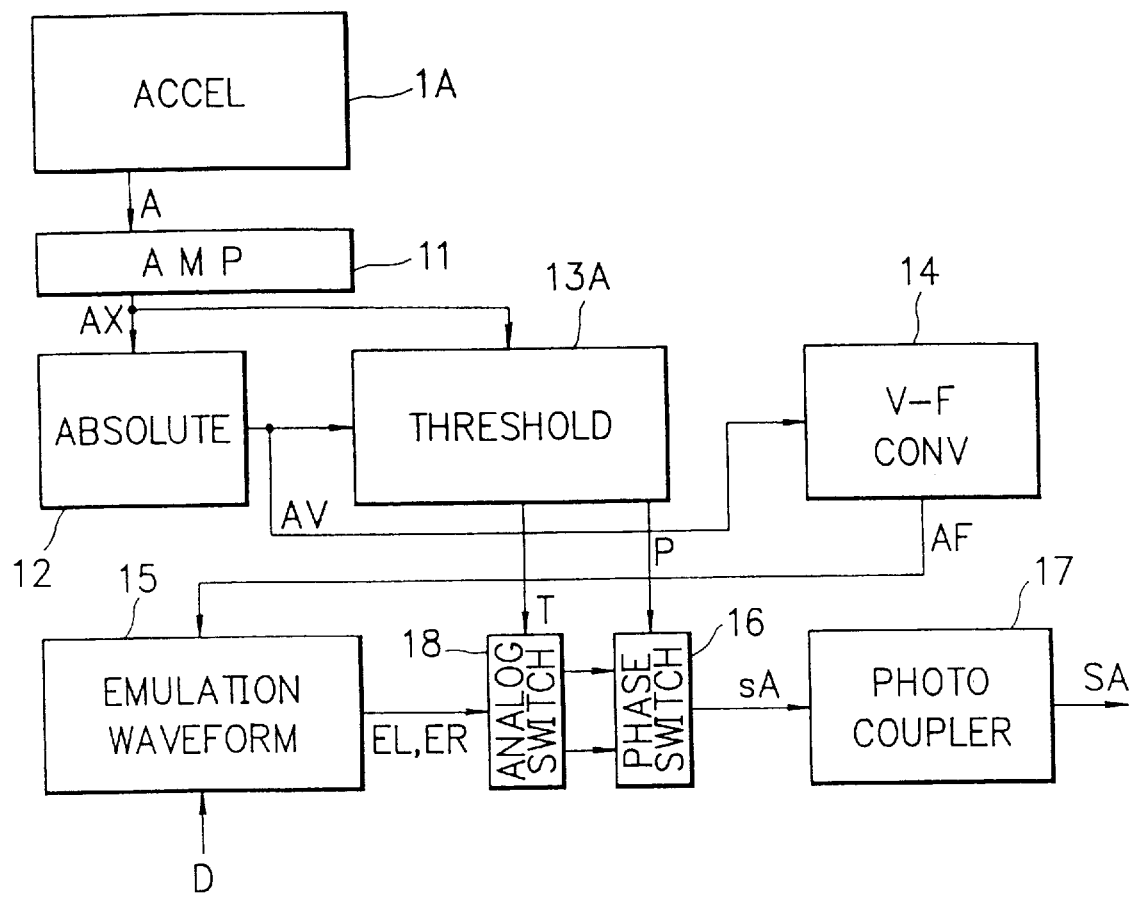
FIG. 5 is a block diagram of the third embodiment of a presentation supporting device according to the present invention.

In FIG. 5, there is shown the third embodiment of a presentation supporting device according to the present invention. In this embodiment, the presentation supporting device is provided with a cursor movement prevention device. In this case, the difference from the first embodiment is that the threshold circuit 13A outputs the enable signal T in addition to the phase switch signal P like the second embodiment, and an analog switch 18 allows the emulation waveform pulses EL and ER output from the emulation waveform generator circuit 15 either to pass to the phase switch circuit 16 or to stop in response to the level of the enable signal T fed from the threshold circuit 13A.

The operation of the analog switch 18 will be described. The analog switch 18 controls to pass the emulation waveform pulses EL and ER to the phase switch circuit 16 when the enable signal T is high level or to stop the same when the enable signal T is low level. Hence, when the voltage of the absolute value signal AV or the acceleration signal A is small, no cursor moving signal SA is output. As a result, the cursor can be kept stopping at the fixed position irrespective of the hand movement of the lecturer.

Figure 6:
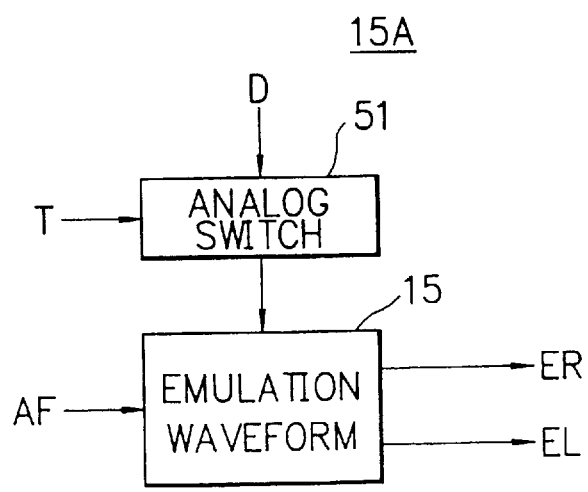
FIG. 6 is a block diagram of an emulation waveform generation circuit of the fourth embodiment of a presentation supporting device according to the present invention.

FIG. 6 shows an emulation waveform generator circuit 15A of the fourth embodiment of a presentation supporting device according to the present invention. In this embodiment, the threshold circuit 13A outputs the phase switch signal P and the enable signal T in the same manner as described above.

In FIG. 6, the emulation waveform generator circuit 15A further includes an analog switch 51 in addition to the emulation waveform generator circuit 15.

The analog switch 51 controls either to pass the phase difference set-up signal D to the emulation waveform generator circuit 15 or to stop the same in response to the high level or the low level of the enable signal T sent from the emulation waveform generator circuit 15A. When the phase difference set-up signal D is stopped by the analog switch 51, in the emulation waveform generator circuit 15A, the emulation waveform pulses EL and ER become the same phase. Hence, the cursor moving signal SA of the same phase is generated and thus the cursor does not move.

In the aforementioned embodiments, the method for moving the cursor by processing the signals using the hardware means has been described. However, by processing the cursor moving signal SA using a software method, the same result can be obtained.

Figure 7:
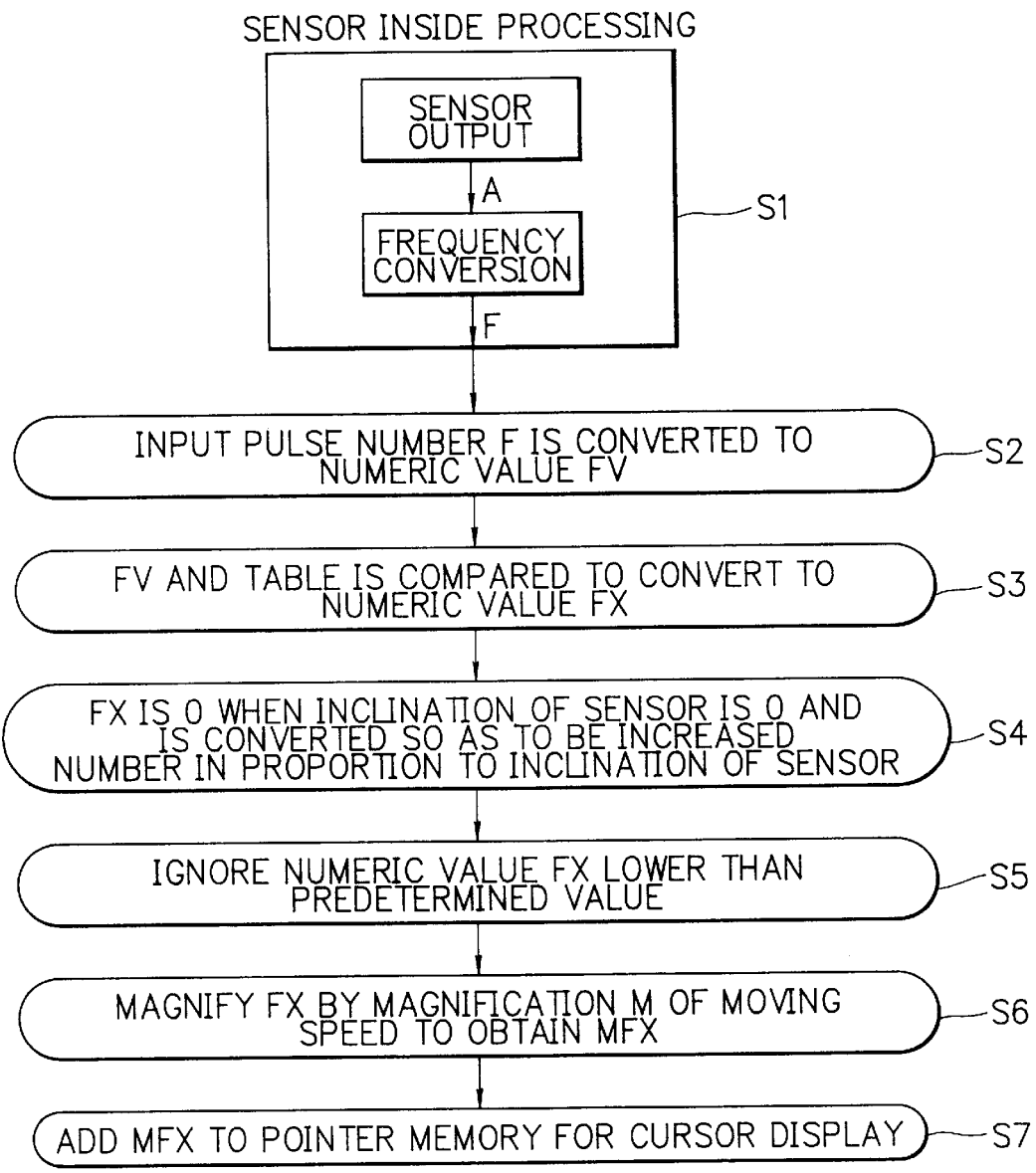
FIG. 7 is a flow chart showing an algorithm of a cursor control in the fifth embodiment of a presentation supporting device according to the present invention.

FIG. 7 is a flow chart showing an algorithm of a cursor control in the fifth embodiment of a presentation supporting device for producing a cursor moving signal SA by a software processing according to the present invention.

In this embodiment, first, an acceleration signal A output from the accelerometer 1A is converted to a frequency signal F using a proper voltage frequency conversion circuit in step S1. Next, the frequency signal F is supplied as a computer input to convert to a numeric value FV representing a frequency in step S2. This numeric value FV is converted to a numeric value FX having a code using a conversion table in step S3. This numeric value FX is 0 when the inclination of the accelerometer is 0 and is converted so as to have an increased value in proportion to the increase of the inclination of the accelerometer in step S4. In order to prevent the unsteady movement of the cursor due to the hand movement, the numeric value FX lower than a predetermined value is ignored in step S5. The converted numeric value FX is multiplied by a magnification M to obtain a numeric value MFX so as to get a suitable cursor moving speed in step S6. For maintaining the cursor moving, the obtained numeric value MFX is added to a present value in a pointer memory for carrying out the cursor display in a computer in step S7. In this manner, the cursor of the computer can be moved.

In this embodiment, if flexibility is given to the pointer, a microcomputer capable of executing the above processing algorithm is provided within the pointer and a cursor moving signal SA corresponding to the numeric value MFX can be output through an I/O (input-output) terminal to be connected to an input terminal of a mouse of a usual computer.

As the moving mode of the cursors, there are two kinds of pointers; one is the above-described type to control the cursor moving speed in proportion to the inclination of the pointer and the other is an absolute position appointment type to allow the cursor position to directly correspond to the movement of the pointer.

In order to allow the cursor position to directly correspond to the display point, the acceleration signal is controlled to be zero when the pointer is stopped. Hence, this can be realized by differentiating the acceleration signals.

Figure 8:
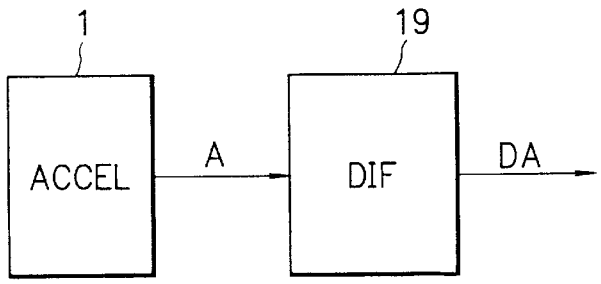
FIG. 8 is a block diagram of the sixth embodiment of a presentation supporting device according to the present invention.

In FIG. 8, there is shown an absolute position appointment presentation supporting device (pointer), the sixth embodiment of a presentation supporting device according to the present invention.

In this embodiment, in the pointer, an accelerometer 1 outputs the acceleration signal A to a differentiation circuit 19. The differentiation circuit 19 differentiates the acceleration signal A to output a differentiated acceleration signal DA.

The operation of this system will be described. The acceleration signal A as the output of the accelerometer 1 is a DC voltage proportional to the inclination and thus the differentiation circuit 19 differentiates the acceleration signal A to obtain the differentiated acceleration signal DA proportional to the rotational speed of the rotatory motion generating the above inclination. When the differentiated acceleration signal DA is used for the cursor moving control, the stopping of the above rotatory motion brings about the stop of the cursor, and hence the pointer motion and the cursor movement are brought close each other.

Figure 9:
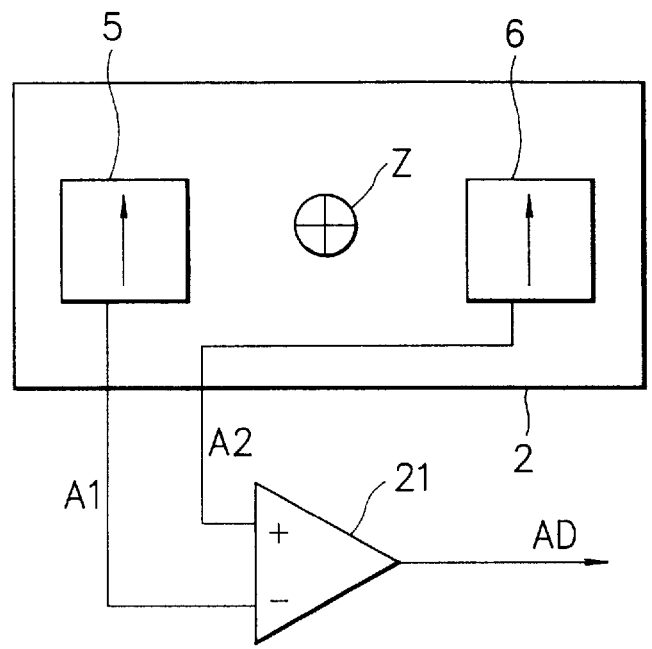
FIG. 9 is a block diagram of the seventh embodiment of a presentation supporting device according to the present invention.

FIG. 9 shows the seventh embodiment of a presentation supporting device (pointer) according to the present invention. In this embodiment, even when the pointer is waved in the lateral direction, the cursor can be moved.

In the pointer, two accelerometers 5 and 6 are arranged in the opposite sides around an axis Z of rotation so that their sensitivity axes may face to the opposite directions, that is, in the same rotational direction with the opposite output polarities, and output acceleration signals A1 and A2, respectively, and a differential amplifier 21 calculates the difference between the input acceleration signals A1 and A2 to output a difference signal AD.

The operation of this system will now be described. The acceleration signals A1 and A2 output from the two accelerometers 5 and 6 are supplied to the differential amplifier 21 and the differential amplifier 21 calculates the difference of the acceleration signals A1 and A2 to output the difference signal AD. Since the output polarities of the accelerometers 5 and 6 are opposite, as described above, the difference signal AD is the sum signal of the summed voltage and hence becomes acceleration information resulting from the rotation when the pointer is waved sideways. Hence, even when the pointer is waved sideways, using the difference signal AD, the cursor can be moved in the lateral direction.

Figure 10:
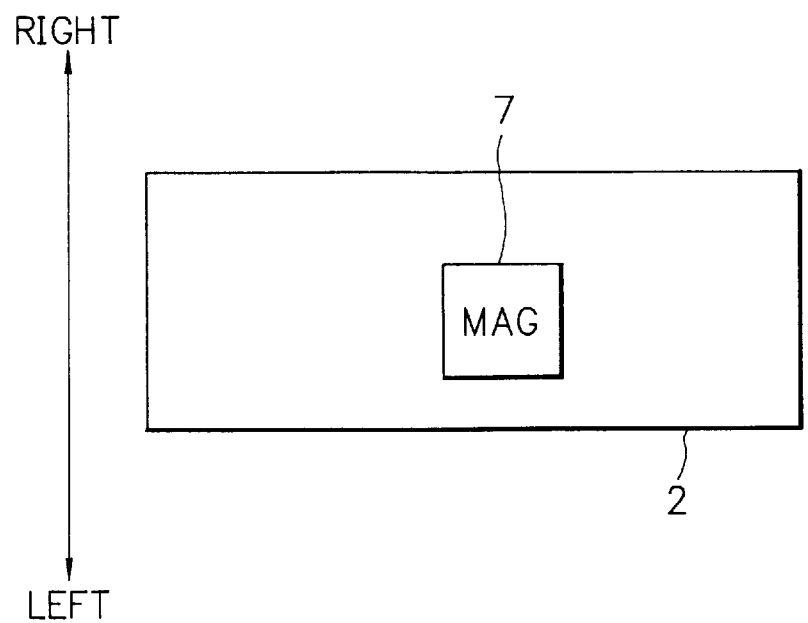
FIG. 10 is a top view of the eighth embodiment of a presentation supporting device according to the present invention.

FIG. 10 shows the eighth embodiment of a presentation supporting device (pointer) according to the present invention. In this case, like the seventh embodiment, even when the pointer is waved in the lateral direction, the cursor can be moved sideways.

In this embodiment, in place of the two accelerometers 5 and 6 of the seventh embodiment, a magnetometer 7 to output a direction signal AZ is arranged in the central position of the pointer so that its sensitivity axis may be parallel to the ground surface.

The magnetometer 7 is composed of a semiconductor magnetometer fabricated using a known Hall element or three-terminal directional magnetoelectric element and its direction signal AZ is a DC voltage which depends on the direction of the terrestrial magnetism and is proportional to the shift angle from the longitude line. Hence, the magnetometer 7 can be used as means for moving the cursor. And no integration is required and the operation is stable.

By using the accelerometer for detecting the vertical direction and the magnetometer for detecting the lateral direction, the pointer can be operated so that the motion of the pointer may be allowed to be perfectly be coincident with the moving direction of the cursor.

Figure 11:
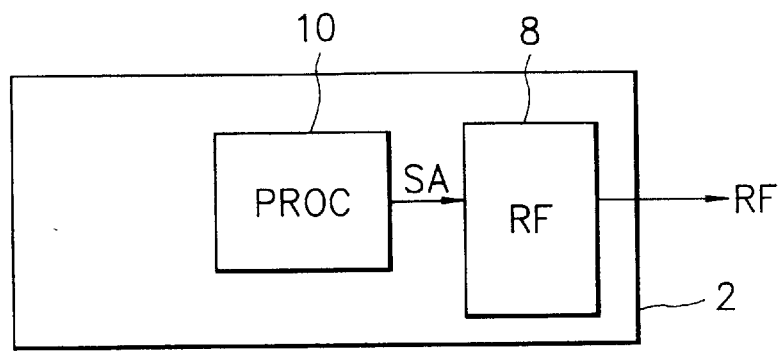
FIG. 11 is a top view of the ninth embodiment of a presentation supporting device according to the present invention.

In FIG. 11, there is shown the ninth embodiment of a presentation supporting device (pointer) according to the present invention. In this embodiment, the cursor moving signal is supplied to the computer by a radio means.

In the pointer, a signal processor 10 outputs the cursor moving signal SA and a radio wave generator 8 codes the cursor moving signal SA to convert to a radio signal RF of an FM band or the like.

On the other hand, the computer (not shown) has a receiver for receiving the radio signal RF and a demodulator for demodulating the radio signal RF into the original cursor moving signal SA, and thus the cursor can be moved in the same manner as the first to eighth embodiments. Hence, the lecturer can readily use the pointer without worrying about the annoying wiring.

Further, if a similar radio signal is applied to another pointer, a plurality of pointers can be employed. In this case, when the lecturer answers to a question of the audience, both can point to the places on the display independently.

Figure 12:
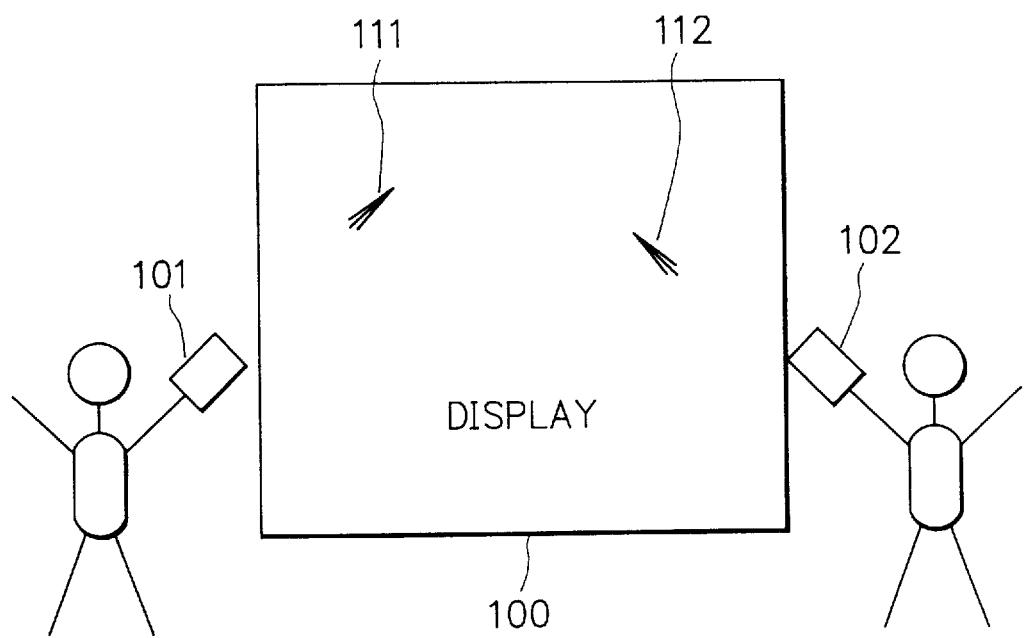
FIG. 12 is a schematic view showing the use of two pointers as the tenth embodiment of a presentation supporting device according to the present invention.

FIG. 12 illustrates the use of a plurality of presentation supporting devices (pointers), the tenth embodiment of the present invention.

In FIG. 12, two humans operate two pointers 101 and 102 and two cursors 111 and 112 shown by the pointers 101 and 102 are placed on a display 100.

The two pointers 101 and 102 have respective identification numbers and the two cursors 111 and 112 corresponding to the respective identification numbers are set. Hence, a plurality of humans can act on the same picture image simultaneously. In particular, at the discussion time in the lecture, it is often advantageous for a questioner to appoint the picture image concerning the question. In this case, this system is very useful.

When the lecturer holds the pointer by hand, usually, the cursor is not placed in the initial position, for example, the screen center but in the previously changed position. Then, the lecturer is required to move the cursor to the intended position. In such a case, the operation can be done easier if the initial position is determined.

Figure 13:
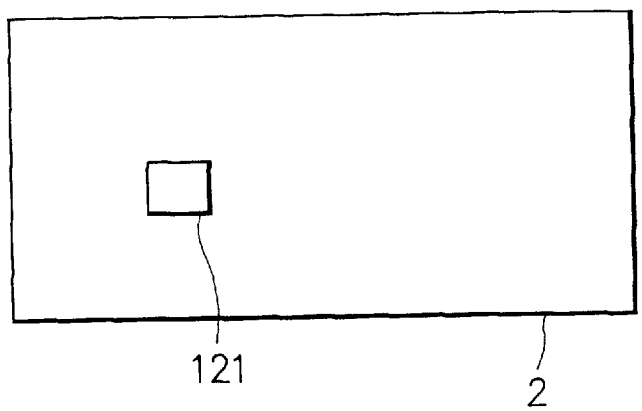
FIG. 13 is a top view of the eleventh embodiment of a presentation supporting device according to the present invention.

FIG. 13 shows the eleventh embodiment of a presentation supporting device (pointer) according to the present invention. In this embodiment, the cursor on the display image can be moved to the initial position.

In FIG. 13, a reset push button 121 to give an instruction for setting the cursor to the initial position is attached to the box body 2 of the pointer. When the lecture pushes the reset push button 121, in response to a reset signal, the computer rewrites the content of the memory for storing the cursor position to the initial value, and as a result, the cursor is set to the initial position.

Figure 14:
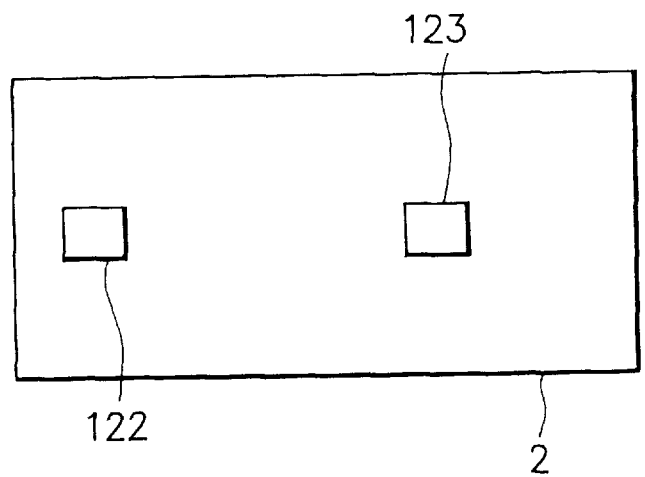
FIG. 14 is a top view of the twelfth embodiment of a presentation supporting device according to the present invention.

FIG. 14 shows the twelfth embodiment of a presentation supporting device (pointer) according to the present invention. In this embodiment, the pages of the presentation screen can be changed.

As shown in FIG. 14, two paging push buttons 122 and 123 for directly instructing page forward and return of the presentation screen to the computer are formed on the box body 2 of the pointer. When the lecturer pushes the paging push buttons 122 and 123, the commands for instructing the page forward and return of the displayed presentation screen are given to the computer and the pages can directly be changed.

In the eleventh and twelfth embodiments, by using the push buttons, various interactive motions can be conducted to the pointer and thus the multimedia presentation can effectively be performed.

As described above, according to the present invention, the presentation supporting device comprises horizontal and vertical accelerometers for detecting horizontal and vertical acceleration of gravity resulting from inclinations in the horizontal and vertical sensitivity axes to output horizontal and vertical acceleration signals, and horizontal and vertical signal processors for processing the input horizontal and vertical acceleration signals to output cursor moving signals for controlling moving speeds and moving directions in the horizontal and vertical directions of a cursor on a computer display screen in response to voltage values and polarities of the horizontal and vertical acceleration signals. Hence, the cursor on the computer display screen can readily be moved to an intending position of a lecturer.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. A presentation supporting device comprising:

first and second discrete accelerometers for individually detecting first and second accelerations of gravity resulting from inclinations in first and second sensitivity axis directions perpendicular to each other to output first and second acceleration signals; and first and second discrete signal processors, individually associated with the first and second accelerometers, for processing input first and second acceleration signals to output cursor moving control signals for controlling moving speeds and moving directions in the first and second coordinate axis directions of a cursor on a computer display screen in response to voltage values and polarities of the first and second acceleration signals, wherein each of the first and second signal processors includes:

an amplifier circuit for amplifying the acceleration signal to output an amplified acceleration signal;

an absolute value circuit for converting the amplified acceleration signal to an absolute value having a voltage value of a positive polarity with respect to a predetermined first reference value to output an absolute value signal; and a first threshold circuit for comparing the amplified acceleration signal with the first reference value to output a phase switch signal corresponding to the comparison result.

2. The presentation supporting device as claimed in claim 1, wherein each of the first and second accelerometers includes:

a cantilevered beam mounted at its first end and having a mass on its free end; and a strain gauge attached near the first end of the cantilevered beam, wherein each accelerometer detects distortion of the cantilevered beam by using the strain gauge to measure the acceleration corresponding to a given stress caused by the mass.

3. The presentation supporting device as claimed in claim 1, further comprising a differentiation circuit for differentiating the acceleration signal to output a differentiated acceleration signal proportional to rotational speed of rotatory motion generating the inclination.

4. The presentation supporting device as claimed in claim 1, further comprising a differential amplifier, wherein the first accelerometer includes first and second rotational accelerometers which are arranged in opposite sides around an imaginary axis of rotation so that their sensitivity axes face to opposite directions, and output first and second rotational acceleration signals, the differential amplifier calculating a difference between the first and second rotational acceleration signals to output a differential rotational acceleration signal.

5. The presentation supporting device as claimed in claim 1, further comprising a reset push button switch for supplying a reset instruction for setting the cursor to an initial position predetermined on the computer display screen.

6. The presentation supporting device as claimed in claim 1, further comprising paging push button switches for instructing page forward and return of the computer display screen.

7. The presentation supporting device as claimed in claim 1, further comprising a radio signal conversion circuit for coding the cursor moving control signals to obtain coded cursor moving control signals and converting the coded cursor moving control signals to radio signals of a predetermined modulation system.

8. A presentation supporting device comprising:

first and second discrete accelerometers for individually detecting first and second accelerations of gravity resulting from inclinations in first and second sensitivity axis directions perpendicular to each other to output first and second acceleration signals; and first and second discrete signal processors, individually associated with the first and second accelerometers, for processing input first and second acceleration signals to output cursor moving control signals for controlling moving speeds and moving directions in the first and second coordinate axis directions of a cursor on a computer display screen in response to voltage values and polarities of the first and second acceleration signals, wherein each of the first and second signal processors includes:

an amplifier circuit for amplifying the acceleration signal to output an amplified acceleration signal;

an absolute value circuit for converting the amplified acceleration signal to an absolute value having a voltage value of a positive polarity with respect to a predetermined first reference value to output an absolute value signal;

a first threshold circuit for comparing the amplified acceleration signal with the first reference value to output a phase switch signal corresponding to the comparison result;

a voltage frequency conversion circuit for converting the absolute value signal to a pulse signal of a frequency corresponding to the voltage value;

an emulation waveform generator circuit for converting the pulse signal to first and second emulation waveforms as control signals for moving the cursor; and phase switch circuit for selecting either a first or second emulation waveform in response to the phase switch signal supplied to output the cursor moving control signal.

9. The presentation supporting device as claimed in claim 8, wherein each signal processor further includes a second threshold circuit for comparing the absolute value signal with a predetermined second reference value to output an enable signal for allowing the cursor moving control signal to output only when the absolute value signal is larger than the second reference value.

10. The presentation supporting device as claimed in claim 9, wherein the voltage frequency conversion circuit includes a voltage-controlled oscillator circuit which is either operated or stopped in response to either a first or second level of the enable signal supplied.

11. The presentation supporting device as claimed in claim 8, wherein each signal processor further includes a first switch circuit for allowing the first and second emulation waveforms to either pass or stop in response to either a first or second level of the enable signal supplied.

12. The presentation supporting device as claimed in claim 8, further comprising a radio signal conversion circuit for coding the cursor moving control signals to obtain coded cursor moving control signals and converting the coded cursor moving control signals to radio signals of a predetermined modulation system.

13. A presentation supporting device comprising:

first and second accelerometers for detecting first and second accelerations and for out-putting first and second acceleration signals each having a voltage value;

first and second signal processors, connected to said first and second accelerometers respectively, for processing input first and second acceleration signals to output cursor moving control signals;

wherein at least one of said first and second signal processors includes a voltage to frequency conversion circuit for converting the acceleration signal voltage value to a pulse signal of a frequency corresponding to the voltage value, wherein said at least one of said first and second signal processors further includes an emulation waveform generator circuit for converting the pulse signal to first and second emulation waveforms as control signals for moving the cursor; and wherein said at least one of said first and second signal processors further includes a first threshold circuit for comparing the acceleration signal with a first reference value to output a phase switch signal corresponding to the comparison result.

14. The presentation supporting device as in claim 13, wherein said at least one of said first and second signal processors further includes a phase switch circuit for selecting either a first or second emulation waveform in response to the phase switch signal supplied to output the cursor moving control signal.

15. The presentation supporting device as in claim 14, wherein said at least one of said first and second signal processors further includes an amplifier circuit for amplifying the acceleration signal to output an amplified acceleration signal, and an absolute value circuit for converting the amplified acceleration signal to an absolute value having a voltage value of a positive polarity with respect to a predetermined first reference value to output an absolute value signal;

wherein said voltage to frequency conversion circuit converts the absolute value signal to a pulse signal of a frequency corresponding to the voltage value.

* * * * *